United States Patent
Mertens

[11] 3,934,318
[45] Jan. 27, 1976

[54] PIPE CLIP

[76] Inventor: Hubert Joseph Mertens, Schiekade 37, Rotterdam, Netherlands

[22] Filed: Oct. 2, 1974

[21] Appl. No.: 511,204

[30] Foreign Application Priority Data
Oct. 2, 1973  Netherlands............... 73113536

[52] U.S. Cl............. 24/249 R; 219/161; 285/287
[51] Int. Cl.²... A44B 21/00; B21J 13/08; F16L 13/08
[58] Field of Search........ 24/81 PE, 249 R, 263 DL, 24/280–283; 285/287; 219/161

[56] References Cited
UNITED STATES PATENTS

| 727,651 | 5/1903 | Loetscher | 24/281 |
|---|---|---|---|
| 2,108,077 | 2/1938 | Robinson | 219/161 X |
| 2,489,535 | 11/1949 | Montague | 24/281 |
| 2,721,581 | 10/1955 | Risley et al. | 285/287 X |
| 3,029,095 | 4/1962 | King et al. | 24/282 X |
| 3,037,258 | 6/1962 | Stokes | 24/263 DL X |
| 3,414,950 | 12/1968 | Phariss | 24/280 |
| 3,512,229 | 5/1970 | Phariss | 24/280 |
| 3,675,278 | 7/1972 | Powell | 24/263 DL UX |

Primary Examiner—Donald A. Griffin
Attorney, Agent, or Firm—David Fink

[57] ABSTRACT

Chain-like clip composed of a number of detachable link members and intended for fixation of pipes to be welded to each other during a welding operation. The clip can easily be adapted to different diameters. Besides uniform clamping force can be exerted also on out-of-round pipes.

5 Claims, 2 Drawing Figures

PIPE CLIP

The invention relates to a chain-like pipe clip for centered fixation of pipe ends to be welded together.

Known pipe clips comprise two clip members, each in the form of a semi-circle which at one end are connected by means of a hinge and at the other end are adapted to be drawn towards each other by means of a tool, like a jack. For welding pipe lengths to each other the respective ends are placed in opposite relationship, axially spaced dependent on the weld to be made and subsequently the clip is placed over the two pipe ends and tightened. The pipe ends are now fixed and can be welded.

Such known clips have in the first place the drawback that for each size of pipe a number of clips in the same size must be kept in stock, so in principle as many clip sizes as there are standard pipe sizes. Furthermore it appears from practice that in many cases the pipe ends to be welded to each other are no longer truly round after transport, storage and the like. Known, two-part clips appear to be permanently deformed when tightened around such out-of-round pipe ends and to be no longer suitable for further use.

The object of the invention is to provide a pipe clip chain of the type defined above, which does not have these drawbacks.

In accordance with the invention the pipe clip for centered fixation of pipe ends to be welded to each other is composed of a number of detachable, hinged link members.

The clip according to the invention is therefore in the form of a chain composed of a number of links. The number of links can be chosen in accordance with the pipe diameter, so that it is not necessary to keep a great number of different clips in stock, but only a limited number will suffice. Moreover a clip composed of link members can adapt itself much better to the circumferential contours of out-of-round pipes than a clip composed of two semi-circular clip-members.

In the first embodiment of the clip according to the invention the link members are interconnected by bolts.

However, the link members are preferably on both sides provided with coupling means in such a manner that the coupling means at one end of a link member are adapted to cooperate with coupling means adjacent the contiguous end of the next link member in the chain-like clip.

A rapid coupling and uncoupling of link members can thus be achieved if the coupling means at one end of each member are formed by transversely projecting pins, while the coupling means at the other end are formed by hooks. As however, although such hook-pin connections are faster in operation than bolt-hole connections, handling of the pipe clip requires some caution because the connections may get loose unintentionally during transport, the hooks may be provided with locking means. These locking means may be formed for instance by spring-tensioned members closing the hook opening.

For the chain-like clip to uniformly engage a pipe with each link member and in order to exert the force exercised by the clip on the pipe ends equally circumferentially, the clip members can each be provided, according to the invention, with a base member extending transversely to the clip members and projecting at the bottom thereof.

In a structurally simple construction each link member can be formed by two webs, transversely connected by a bridge, the base member extending at the bottom of the bridge. In a preferred embodiment a downwardly opening recess is made centrally in the lower part of the bridge adjacent the base member for passing a welding electrode.

The link members can be formed by welding webs and bridge to each other or by casting each link member integrally.

Besides the invention relates to end links located at both ends of the link chain for mounting a tool on the clip, said tool often being a hydraulic jack, by means of which the clip ends, for tightly embracing pipe ends to be welded, can be drawn towards each other.

In a first embodiment of the clip member there is provided at one end of the chain clip an end link having a hook which in mounted condition of the chain projects radially and is directed away from the other clip end, while the other end link has a radially projecting base plate.

On the base plate can be mounted a hydraulic jack in such a manner that the piston rod extending from the jack cylinder is directed away from the other end link with the hook. The end of the jack piston rod can be received in a socket attached to one of the crossbars of a clip member composed of two crossbars and two longitudinal bars. The other crossbar of the clip member can then be received in the jaw of the hook of the other end link. When the jack expands the two end links are drawn towards each other through the drawing frame.

Though in this way a reliable operation of the pipe clip can be ensured the end link construction can be further improved. As the line of action of the jack lies outside the pitch circle of the link members an inwardly directed force component is exerted on the end links, so that in actual practice, particularly with pipes or tubes of small wall thickness with respect to the diameter, a flattening takes place adjacent the end links. Furthermore, as the jack expands and consequently the clip member contracts while the pitch circle is reduced, the angular position of the line of action of the jack is changed, which may result in torsion between the cylinder and the piston of the jack.

Therefore, instead of two end links preferably one connecting link is used.

The connecting link may be composed of two toggle levers which adjacent the bend are hinged to each other, each at one end of one lever arm having connecting means with the clip and at the end of the other lever arm connecting means with the jack. When the jack expands the respective lever ends are pushed apart and consequently the other lever arms connected with the clip ends are moved towards each other in the pitch circle.

In order to avoid distortion between the jack cylinder and the piston the toggle levers can each be constructed as two plates which at the lever ends with which the jack must engage are connected by a crossbar, a sleeve being arranged around each cross-bar, while on one sleeve a base plate for the jack cylinder and on the other sleeve a socket is mounted for receiving the piston rod end.

The invention will now be elucidated with reference to the accompanying drawings showing some embodiments of the pipe clip.

Figure 1:
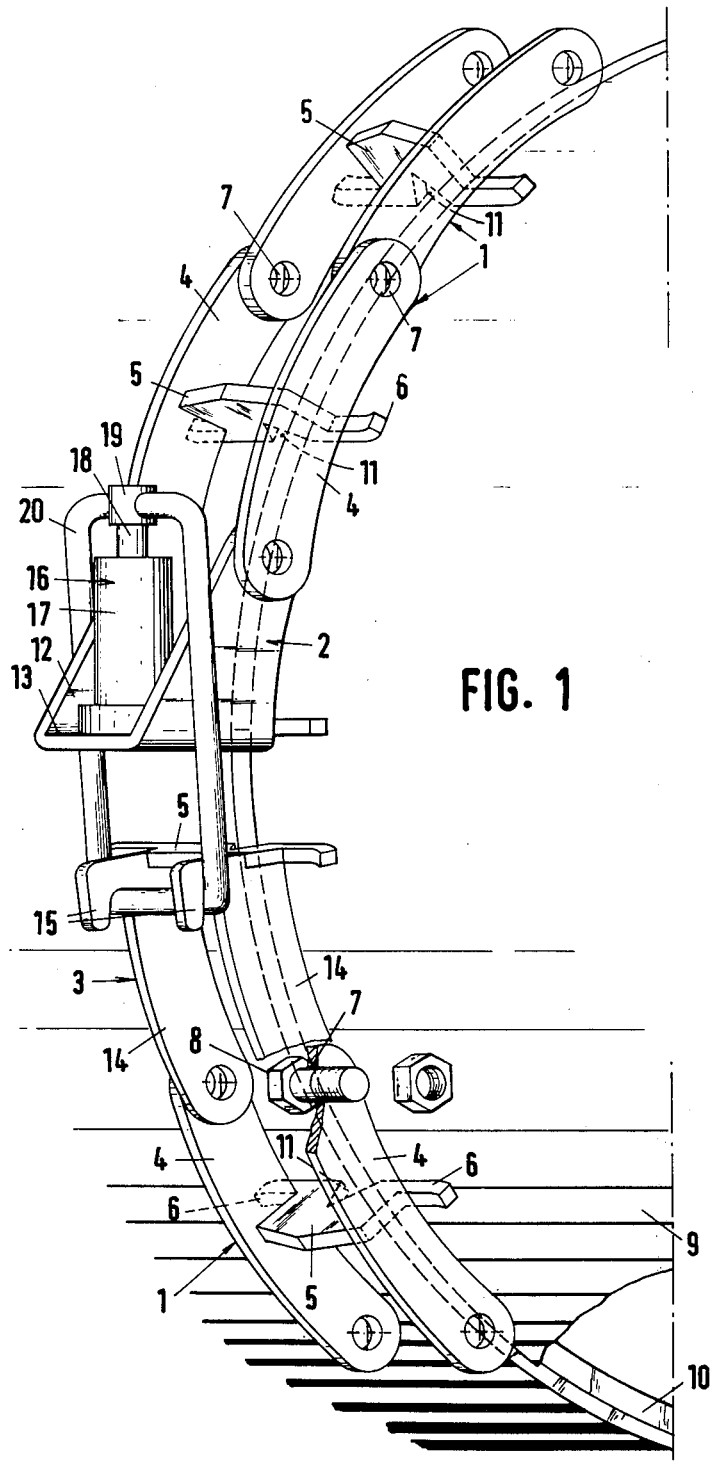
FIG. 1 is a perspective detailed view of a first embodiment of the clip.

In the drawing, in particular FIG. 1, the clip is composed of link members 1 and two end links 2 and 3. Each member comprises two webs 4 connected by a bridge 5. Projecting from the bottom of the webs 4 there is a base member 6 which in the embodiment shown is integral with the bridge 5, but which may also be differently fixed relative to the webs 4 of each link member 1, e.g. by welding. The bridge 5, in the depicted form, is also welded to the webs 4. Naturally it is possible that webs 4, bridge 5 and base member 6 are cast integrally. The link members 1 are provided at the ends with holes 7 for passing bolts 8. By means of the bolts 8 it is possible to interconnect successive link members and to connect the end links 2, 3 thereto, thus forming a flexible pipe clip which, for welding together two pipe lengths 9 and 10, can be positioned over the pipe ends facing each other, said clip being adapted for centered fixation of said ends for performing a welding operation. Preferably the connection bolts 8 are of the type having a smooth shank portion and a thread end for a nut. The web ends of successive links can then hinge about the smooth shank portion of the bolts. Through the base member 6 and in the lower portion of the bridge 5 there is formed a recess 11 so that also the butt joint portion present underneath a base member 6 is accessible to a welding electrode.

The end links 2 and 3 have a form which deviates from the link members 1. The end link 2 has two cheeks 12 which are connected in transverse direction by a base plate 13. Adjacent the free ends of the webs 12 there are also made holes 7 for connecting the end link 12 to a link member 1 through bolts 8. To the base plate is connected a bridge 5 provided with a base member 6. The other end link 3 is fitted with webs 14 which are connected to a base member 6 through a bridge 5. On the bridge 5, adjacent said end link 3, there are welded two hooks 15.

For tightening the clip shown in FIG. 1 about the ends of pipe lengths 9 and 10 to be welded together, there is positioned on the base plate 13 of the end link 2 a hydraulic jack 16 which may be provided with a cylinder portion 17 and a piston rod 18 projecting therefrom. The end of said rod 18 is accommodated in a socket 19 secured to a clip member 20 having the form of a rectangular frame. The socket 20 is attached to a shorter side of the rectangle, the opposite shorter side being positioned in the jaw of the hooks 15. By urging the piston rod 18 from the cylinder 17 during operation of the jack, the end links 2 and 3 are drawn towards each other. The clip shown in FIG. 1 is composed of alternating narrower and wider link members.

Figure 2:
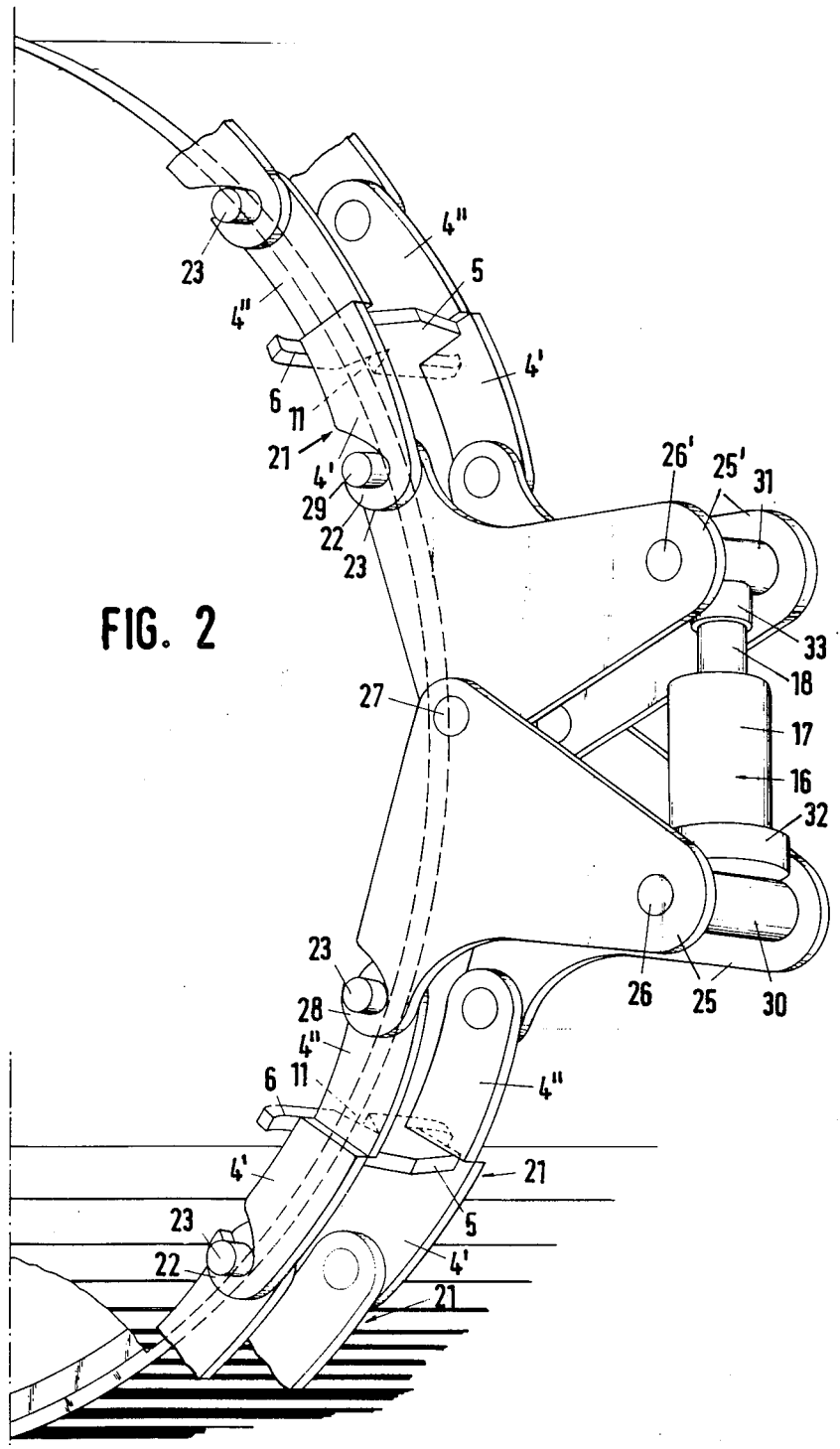
FIG. 2 is a similar view of a second embodiment.

In the embodiment shown in FIG. 2 the link members 21 are all identical. Centrally disposed there is a transversely extending bridge 5 with base member 6 and a recess 11 at the bottom. The webs of the link members 21 however are divided. The web halves 4' which extend from the bridge 5 to one end of the members 21 have a larger interspace than the web halves 4" so that with successive link members 21, the webs 4" can each time be introduced between the ends of the webs 4' of the other link member.

At the ends of the web halves 4' there are formed hooks 22, while the ends of the web halves 4" are provided with laterally extending pins 23. Successive link members 21 can therefore be coupled by causing the hooks 22 to grip over the pins 23. The pins may be received and welded in holes formed in the web ends. The web halves 4' and 4" may be welded to each other and to the bridge 5 or a link member 2 may also be cast integrally.

As shown in FIG. 2 the ends of the pipe clip are interconnected by a member 24 which includes two toggle levers. The connecting-member 24 is composed of four substantially triangular plates 25, 25'. The plates 25, 25' are interconnected by cross-bars 26, 26' adjacent one of the angular points of the triangular plates. At another angular point a plate 25 is each time pivoted to a plate 25' through a bolt 27 or otherwise. In the third angular point each plate 25 is provided with a hook 28, just as the hook 22 of a link member 21. Each plate 25' is provided at the third angular point with a transversely extending pin 29, just as the pins 23 of the link members 21. The connecting member 24 can therefore be accommodated in the clip by engagement of the hooks 28 with pins 23 of a link member and co-action of the pins 29 with the hooks 22 of a link member. On the cross-bars 26, 26' there are rotatably mounted sleeves 30, 31. To the sleeve 30 there is secured a base plate 32 and to the sleeve 31 a socket 33. A jack 16 can now be positioned with the cylinder portion against the base plate 32 and with the free end of piston rod 18 in the socket 33. As the jack 16 expands the cross-bars 26, 26' are pushed apart. The plates 25 rotate clockwise relative to the pivots 27 and the plates 25' counter-clockwise, so that the angular points of the plates 25, 25', where the hooks 28, the pins 29, respectively, are positioned, are drawn towards each other, thus tightening the clip around the pipe ends. The pulling force is exerted precisely according to the pitch circle of the "chain" formed by the link members. During the expansion of the jack 16, the sleeves 30, 31 can rotate about the cross-bars 26, 26', thus avoiding torsion between piston portion 18 and cylinder portion 17.

It will be clear that the invention is not limited to the embodiments described but that many variants are possible in the scope of the present invention. For instance the connecting member 24 shown in FIG. 2 can be combined with a pipe clip as shown in FIG. 1. The link members 1 shown in FIG. 1 may be fitted instead of with bolt passages, alternately with cross pins and hooks. Furthermore in the embodiment shown in FIG. 2 there may be disposed adjacent the hooks 22, locking members for preventing that during the handling of the clip the link members are mutually disengaged. It will also be clear that instead of a jack other tools might be employed for exerting the required pulling force on the link members of the pipe clip.

I claim:

1. A pipe clamp for centered fixation of pipe ends to be welded together, comprising, in combination:
    a chain comprising a plurality of detachably interconnected chain link elements; and
    first and second coupling means connected at the respective ends of said chain and operative to cooperate with each other for straining said pipe clamp around said pipe ends;
    said chain link elements comprising two lateral elements extending longitudinally with respect to said chain, a transverse bridge element extending between said two lateral elements and interconnecting them to each other, a transverse base bar extending between said two lateral elements and interconnecting them to each other, said base bar having a recess defined in a central portion of its side near said pipe ends of sufficient size to permit the passage of a welding electrode therethrough, and first and second linking means connected at the respective ends of said two lateral elements and operative for pivotal connection to another of said chain link elements and said coupling means, whereby said pipe clamp is flexible and the length of said chain can be changed to be suitable for pipes having different diameters.

2. The pipe clamp as claimed in claim 1, wherein said first linking means includes transversely extending pins and said second linking means includes hooks operative to engage said pins.

3. The pipe clamp as claimed in claim 1, wherein said first coupling means includes a hook which extends radially and is disposed near said second coupling means when said pipe clamp is positioned for use and said second coupling means includes a base plate which extends radially when said pipe clamp is positioned for use.

4. The pipe clamp as claimed in claim 1, wherein said coupling means comprises two toggle levers hinged together at their respective bends and each of said toggle levers having one lever arm connected to the respective ends of said chain, and a jack connected to the other respective lever arms.

5. The pipe clamp as claimed in claim 4, wherein each of said toggle levers comprises two plates facing each other and spaced apart from each other and a cross-bar connected to and extending between said plates, and a sleeve disposed about said cross-bar, a base plate for said jack connected to one of said cross-bars and a socket to receive the piston rod of said jack connected to the other of said cross-bars.

* * * * *